United States Patent [19]

Kuehbauch

[11] Patent Number: 4,920,602
[45] Date of Patent: May 1, 1990

[54] WINDOW WASHER APPARATUS FOR A MOTOR VEHICLE WINDOW

[75] Inventor: Gerd Kuehbauch, Buehlertal, Fed. Rep. of Germany

[73] Assignee: Robert Bosch GmbH, Stuttgart, Fed. Rep. of Germany

[21] Appl. No.: 339,234

[22] Filed: Apr. 14, 1989

[30] Foreign Application Priority Data

Jul. 20, 1988 [DE] Fed. Rep. of Germany ....... 3824483

[51] Int. Cl.$^5$ .............................................. A47L 1/02
[52] U.S. Cl. .............................. 15/250.04; 15/250.35; 15/250.34; 464/88
[58] Field of Search ........... 15/250.02, 250.04, 250.05, 15/250.34, 250.35, 250.19, 250.20, 250.35; 464/56, 88

[56] References Cited

U.S. PATENT DOCUMENTS

| | | | |
|---|---|---|---|
| 1,733,546 | 10/1927 | Londino | 15/250.04 X |
| 2,168,202 | 8/1939 | Grantham | 15/250.04 |
| 2,174,010 | 9/1939 | Patterson | 464/88 |
| 2,714,739 | 8/1955 | Neufeld | 15/250.04 |
| 2,952,143 | 9/1960 | Case | 464/88 |
| 2,952,864 | 9/1960 | NIxon | 15/250.04 |
| 3,793,666 | 2/1974 | Wurin | 15/250.02 |
| 3,863,464 | 2/1975 | Taggart et al. | 464/88 |
| 4,750,235 | 6/1988 | Scorsiroli | 15/250.34 X |

FOREIGN PATENT DOCUMENTS

| | | | |
|---|---|---|---|
| 3534084 | 7/1986 | Fed. Rep. of Germany | 15/250.05 |
| 207052 | 2/1968 | U.S.S.R. | 15/250.02 |

Primary Examiner—Frankie L. Stinson
Attorney, Agent, or Firm—Michael J. Striker

[57] ABSTRACT

The washer apparatus for washing the window of a motor vehicle comprises a wiper blade oscillating over the window sitting on a hollow shaft, which is provided with at least one nozzle directed at the window to be washed. A washer fluid feed occurs to the nozzle through a structural element in a shaft passage of the hollow shaft, whose one downstream end portion is rigidly attached with the hollow shaft. A particularly trouble-free and economical washer apparatus can be attained when the other upstream end portion of the structural element is held fixed behind an upstream opening of the shaft passage and the structural element is at least partially made from a pliable material.

11 Claims, 3 Drawing Sheets

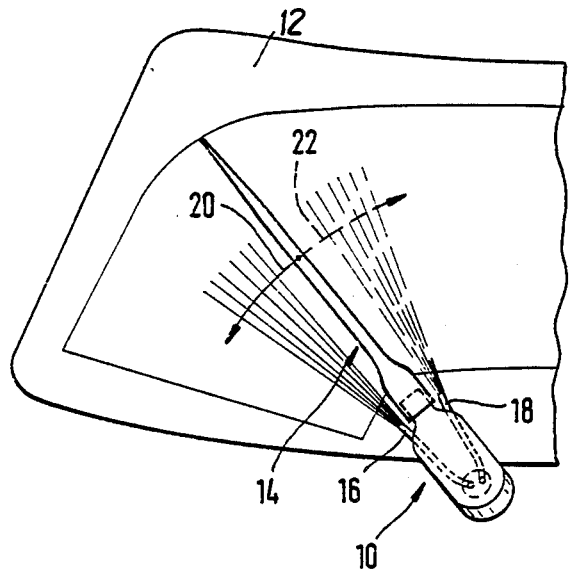
FIG.1
FIG.2
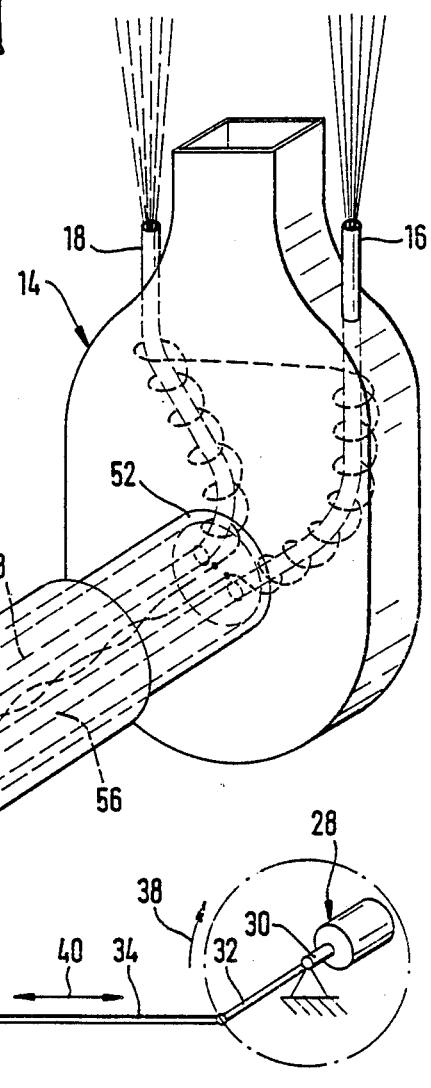
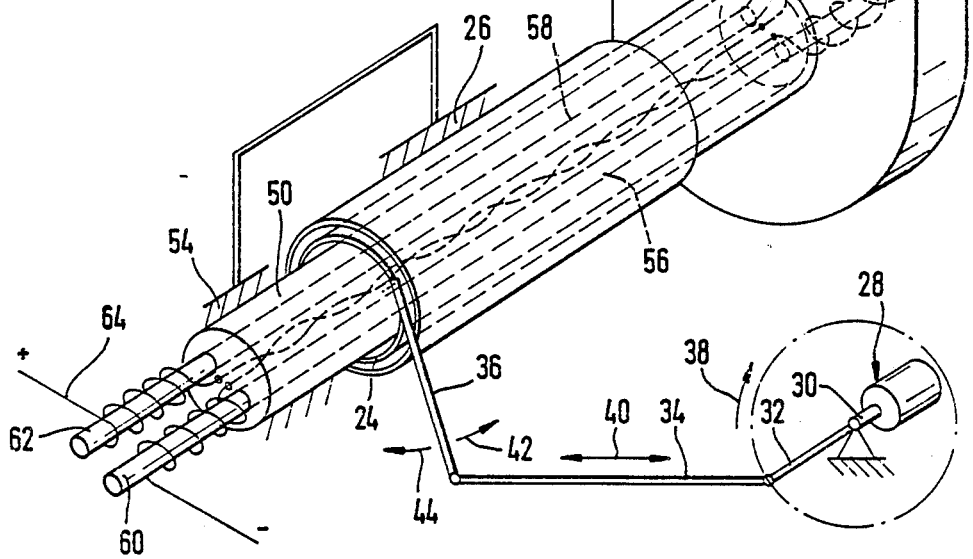

WINDOW WASHER APPARATUS FOR A MOTOR VEHICLE WINDOW

BACKGROUND OF THE INVENTION

My invention relates to a window washer apparatus for a motor vehicle windshield or window.

The known window washer apparatus for a motor vehicle window comprises a wiper arm which oscillates over the window mounted on a hollow shaft, which is provided with at least one nozzle directed at the window or windshield to be washed. The feed of washer fluid to the nozzle occurs by a structural element located in a shaft passage in the hollow shaft. One downstream end portion of the structural element is connected rigidly with the hollow shaft.

This general type of motor vehicle window washer apparatus is already known and is taught in French Pat. No. 84 402 and also in French Pat. No. 13 07 974. A pipe is held in and projects from both ends of a hollow shaft. These ends form pipe connectors for flexible feed tubes which must have tubing loops adjacent the connection point which are comparatively large and easily moved, especially in a transition region near the mount attached to the body or chassis at the movable pipe connectors so that the oscillatory motion can be provided. The known arrangement is comparatively space-consuming, troublesome and expensive.

SUMMARY OF THE INVENTION

It is an object of my invention to provide an improved window washer apparatus for a motor vehicle windshield which saves space and is comparatively inexpensive.

It is another object of my invention to provide an improved window washer apparatus for a motor vehicle windshield or window which is less likely to have operational difficulties and is less troublesome than the current window washer apparatus.

In keeping with these objects and with others which will become more apparent hereinafter, the structural element is at least partially made from a pliable, advantageously elastic material, and the upstream end portion of the structural element is held fixed adjacent the upstream opening of the hollow shaft.

Our invention has the very desirable advantage that the motion compensation for the washer fluid feed occurs between the body of the motor vehicle and the washer shaft inside the hollow shaft so that external influences on the wash fluid feed and the structure assisting it are eliminated.

Other embodiments of our invention are possible. The structural element can have play in the hollow shaft relative to the hollow shaft up to the rigidly attached upstream end portion of the structural element. A lubricant can be provided in the gap between the hollow shaft and the structural element. Also the structural element can have at least two longitudinal passages for the washer fluid and each of the longitudinal passages leads to a separate nozzle associated with each. Of course these nozzles can be operated alternately depending on the pivot direction of the wiper arm.

In one advantageous embodiment the structural element is formed in two parts, one of the structural element parts is made of a pliable material nonrotatably fixed with the hollow shaft and the other structural element part is made of a comparatively more rigid material. These structural element parts are advantageously attached with each other inside the hollow shaft. The other structural element part can have a locking means, which cooperates with an opposing locking means of the one structural element part. The structural element part made of flexible material adjacent the wiper arm is connected with at least one connector pipe penetrating the hollow shaft radially.

The connector pipes can be mounted in a two part connector casing gripping the hollow shaft, whose connector casing parts are engagable, advantageously lockable, with each other.

The other structural element part made of the rigid material may be provided with retaining means for a plurality of flexible tubes connectable to the structural elements.

The structural element is advantageously heatable.

BRIEF DESCRIPTION OF THE DRAWING

The objects, features and advantages of my invention will be made more apparent from the following detailed description, reference being made to the accompanying drawing in which:

FIG. 1 is a schematic diagram of a window washer apparatus according to my invention in operation on a windshield or window of a motor vehicle.

FIG. 2 is a detailed perspective view of a portion of the window washer apparatus according to a first embodiment of my invention showing two ducts for washer fluid in the hollow washer shaft.

DETAILED DESCRIPTION OF THE INVENTION

Figure 3:
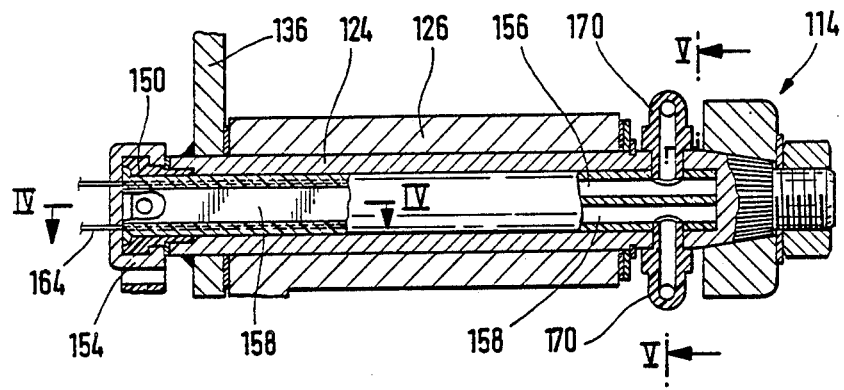
FIG. 3 is a longitudinal cross sectional view through a hollow shaft mount according to another embodiment of our invention.

A window washer unit 10 shown in FIG. 1 for the windshield or window 12 of a motor vehicle, which has not been shown in detail, has a wiper arm 14, which is formed with a conventional washer arm and a generally known washer blade. Two nozzles 16 and 18, which apply washer fluid to the window 12, are mounted on the wiper arm 14. The nozzles 16 and 18 operate out-of-phase or alternatingly so that the window portions adjacent the wiper arm 14 are continuously wet or moistened according to the pivot direction(arrow 20 and 22) of the wiper arm 14.

In FIG. 2 only a portion of the wiper arm 14, which is connected with a hollow shaft 24, is shown. The connection between the hollow shaft 24 and the wiper arm 14 is not illustrated in detail in FIG. 2 for improved clarity. However the hollow shaft 24 is attached rigidly with the wiper arm 14. The hollow shaft 24 itself is guided in a pivot bearing indicated with 26. The drive motion of the washer shaft occurs by drive unit 28 with a revolving drive shaft 30, which is attached rigidly with a crank 32. One end of a push rod 34 is pivotally connected to the free end of a crank 32. The other end of the push rod 34 is pivotally attached with a rocker arm 36 which is attached for its part to the pipe-like hollow shaft 24. If the crank 32 rotates now in the direction of the arrow 38, the push rod 34 performs a substantially to- and fro- motion(double arrow 40) and transmits these motions to the rocker arm 36 which produces an oscillatory motion indicated by the arrows 42 and 44. The pivot motions 42, 44 correspond to the pivot motions 20,22 of the wiper arm 14. The longitudinal passage of the pipe-shaped hollow shaft 24 contains a structural element 50 whose one downstream end portion 52 is attached with the wiper arm 14. The other upstream end portion of the structural element 50, as indicated at 54, is held fixed in the body or chassis of the motor vehicle. The structural element 50 is rod like in the embodiment according to FIG. 2, in which it has radial play in the passage of the pipe-shaped hollow shaft 24. This results in a circular gap which can be filled with lubricant. As indicated further in FIG. 2 the structural element 50 has two longitudinal passages 56 and 58, whose first ends are connected with the nozzles 16 and 18. The other ends of the longitudinal passages 56 and 58 are connected to ducts 60 and 62 which act for washer fluid feed. So that the structural element 50 between both its ends 52 and 54 can compensate for the pivotal motion of the wiper arm 14, the structural element 50 is made partially of a pliable, advantageously elastic material. Because of that the structural element 50 can be held fixed at one end at 54 and on the other hand its end 52 can be attached with the wiper arm 14 performing the pivotal motion. The compensation for the motion between the fixed holder 54 and the moving wiper arm 14 occurs inside the pipe-shaped hollow shaft 24. Further from FIG. 2 it appears that the end 52 of the structural element 50 in the vicinity of the unshown opening of the shaft passage downstream relative to the flow direction of the washer fluid is attached with a pivoting component—for example, the washer shaft 24 and the wiper arm 14. The other upstream end of the structural element 50 held fixed adjacent the upstream opening of the passage of the pipe-shaped hollow shaft 24 at 54. Subsequently FIG. 2 shows that the structural element 50 can also have a heating element 64, which resides near the longitudinal passages 56, 58 of the structural element 50. The heating element 64 can be extended to the wiper arm 14 and nozzles 16 and 18.

Figure 4:
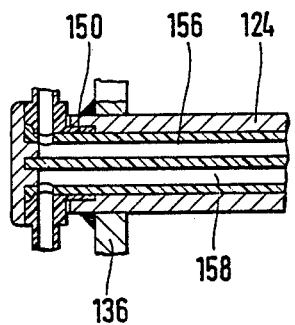
FIG. 4 is a cross sectional view of the apparatus of FIG. 3 taken along the section line IV—IV.
Figure 5:
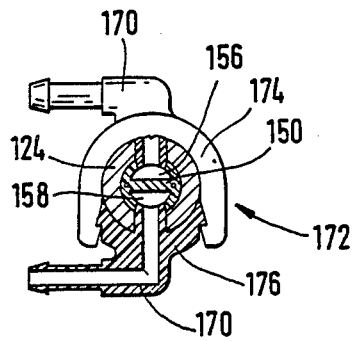
FIG. 5 is a cross sectional view of the apparatus of FIG. 3 taken along the section line V—V.
Figure 6:
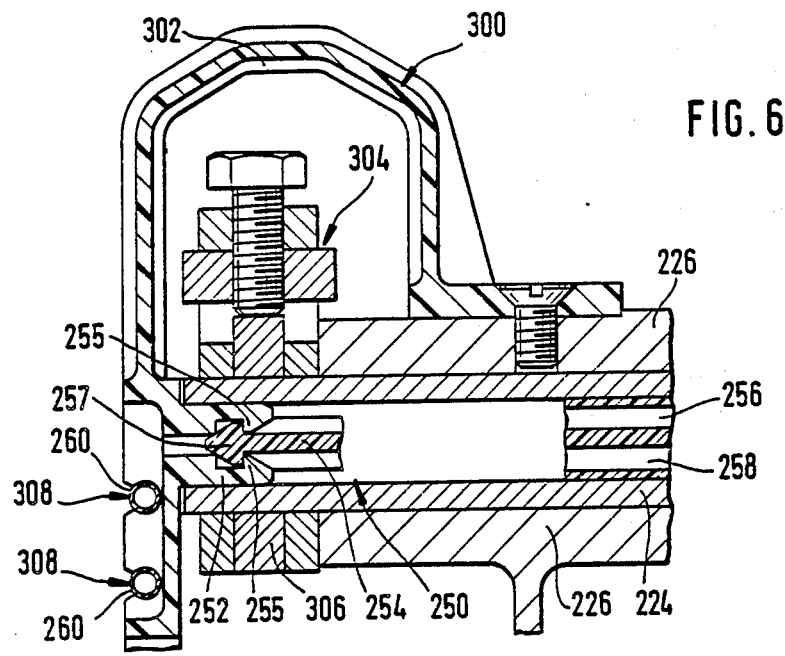
FIG. 6 is a longitudinal cross sectional view through a window washer mount in another embodiment of the window washer apparatus of my invention.
Figure 9:
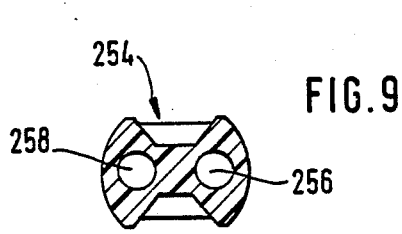
FIG. 9 is a transverse cross sectional view taken along the section line IX—IX of FIG. 8.
Figure 8:
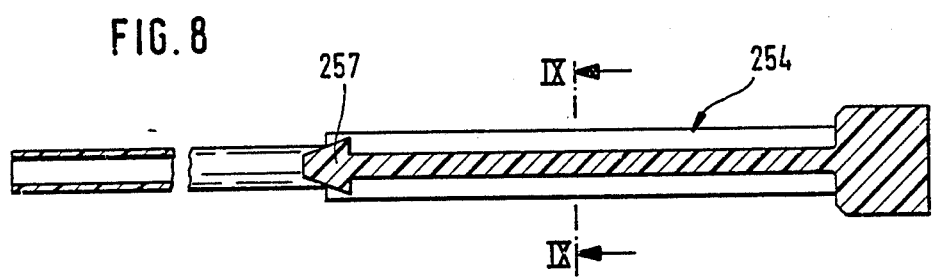
FIG. 8 is a longitudinal cross sectional view of the part shown in FIG. 7.
Figure 7:
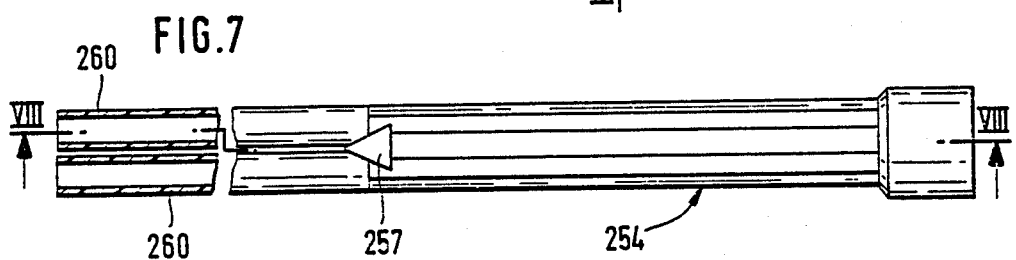
FIG. 7 is a plan view of a part of the structural element shown in FIG. 6.

Another embodiment of our invention is shown in FIGS. 3 to 5. Especially FIG. 3 shows the pipe-shaped hollow shaft 124, which is guided in a fixed window washer housing 126. Further the rocker arm 136 attached rigidly with the washer shaft 124 is shown in more detail in FIG. 3. One can see that the structural element 150 is held fixed at one end by a retaining means 154 not shown in detail. The other end of the structural element 150 is anchored on the washer shaft 124. Adjacent the wiper arm 114 the pipe-shaped hollow shaft 124 has two connector pipes 170 radially oriented, which are connected with both longitudinal passages 156,158. The special arrangement of the connector pipes 170 is shown in FIG. 5. FIG. 5 shows that each of the connector pipes 170 is mounted on one half of a connector casing 174,176 gripping the pipe-shaped hollow shaft 124, whose two connector casing parts 174,176 are locked with each other. In a known way tubing, which lead to the nozzles, are connectable to both connector pipes 170. The feed of wash fluid to the structural elements 150 is particularly well shown in FIG. 4. From FIG. 3 it is apparent also that in this embodiment a heating element 164 is provided in the structural element 150 and is fed through it. In the simplified representation the structural element 150 is broken off in the middle portion. One should realize that the conditions illustrated in FIG. 3 are such that a twisting motion is occurring under constraint during the pivotal motion of this structural element 150 in the cutaway unshown central region of the structural element so that of course in the right half of the structural element 150 that is connected with the wiper arm 114, both longitudinal passages 156, 158 appear in cross section while in the left half only the one longitudinal passages 158 appears.

An additional embodiment of our invention is shown in FIGS. 6 to 9. In this embodiment the structural element 250 is constructed in two parts. The structural element 250 is mounted similarly inside the pipe-shaped hollow shaft 224, which is guided in a pivot bearing 226. Both of the parts 252 and 254 of the structural element 250 are detectable in FIG. 6. The one part 252 is part of a curved casing portion 300, which is attached rigidly with the pivot bearing 226. A bulged out region 302 of the curved casing portion 300 covers an attachment means 304 for the rocker arm 306. The curved casing portion 300 engages now with a pin-like projection in the passage of the washer shaft 224 and forms thus one part 252 of the structural element 250. Retaining members 308 for feed tubes for the washer fluid are formed as part of the curved casing portion 300. The curved casing portion 300 together with the structural part 252 is made from comparatively rigid material. The part 252 is equipped on its end portion with locking means 255, which cooperated with opposing locking means 257 of the other part 254. The other structural element part 254 is particularly easily seen in FIGS. 7 to 9. It is made from a more pliable material than the structural element part 252. Further it has two longitudinal passages 256, 258, which adjacent the region of the opposing locking means 257 continue in flexible tubes 260 which are anchored in the retaining members 308 of the curved casing portion 300. In this embodiment the apparatus is designed so that the comparatively rigid structural element part 252 is held fixed by the curved casing portion 300, while the structural element portion 254 comprising a pliable material is rigidly attached with the wiper arm and/or with the pipe-like hollow shaft 224. The adjustment for the oscillatory motion occurs thus similarly inside the hollow shaft 224. Naturally it is conceivable that the structural element 252, 254 can be made by a currently known socalled binary injection molding process in which a single piece structural element is produced which is made partly from a rigid material and has at least a portion which comprises a considerably more flexible material.

It will be understood that each of the elements described above, or two or more together, may also find a useful application in other types of constructions differing from the types described above.

While the invention has been illustrated and described as embodied in a window washer apparatus for a motor vehicle windshield, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

What is claimed is:

1. In a window washer apparatus for a motor vehicle window, with a wiper arm oscillating over said window sitting on a hollow shaft, which is provided with at least one nozzle directed at said window to be washed and a washer fluid feed to said nozzle through a structural element in said hollow shaft, whose one downstream end portion is rigidly attached with said hollow shaft, the improvement wherein said structural element is at least partially made from a pliable material and the other upstream end portion of said structural element is held fixed adjacent an upstream opening of said hollow shaft.

2. The improvement defined in claim 1 wherein said pliable material is elastic.

3. The improvement defined in claim 1 wherein said structural element has play in said hollow shaft until at said upstream end portion of said structural element rigidly attached to said hollow shaft.

4. The improvement defined in claim 1 wherein said structural element has at least two longitudinal passages for said washer fluid and each of said longitudinal passages leads to one of said nozzles associated therewith.

5. The improvement defined in claim 1 wherein said structural element is formed in two parts, one of said parts being made of said pliable material nonrotatably fixed with said hollow shaft and the other of said parts being made of a comparatively more rigid material and said structural elements being connected with each other inside said hollow shaft.

6. The improvement defined in claim 5 wherein said other structural element part has a locking means, which cooperates with an opposing locking means of said one structural element part.

7. The improvement defined in claim 5 wherein said one structural element part made of said flexible material adjacent said wiper arm is connected at least with one connector pipe penetrating said hollow shaft radially.

8. The improvement defined in claim 7 wherein said connector pipe is mounted in a two-part connector casing gripping said hollow shaft, whose connector casing parts are connectable with each other.

9. The improvement defined in claim 8 wherein said connector casing parts are lockable with each other.

10. The improvement defined in claim 5 wherein said other structural element part made of said rigid material is provided with retaining means for a plurality of flexible tubes connectable to said structural element.

11. The improvement defined in claim 1 wherein said structural element is heatable.

* * * * *